UNITED STATES PATENT OFFICE.

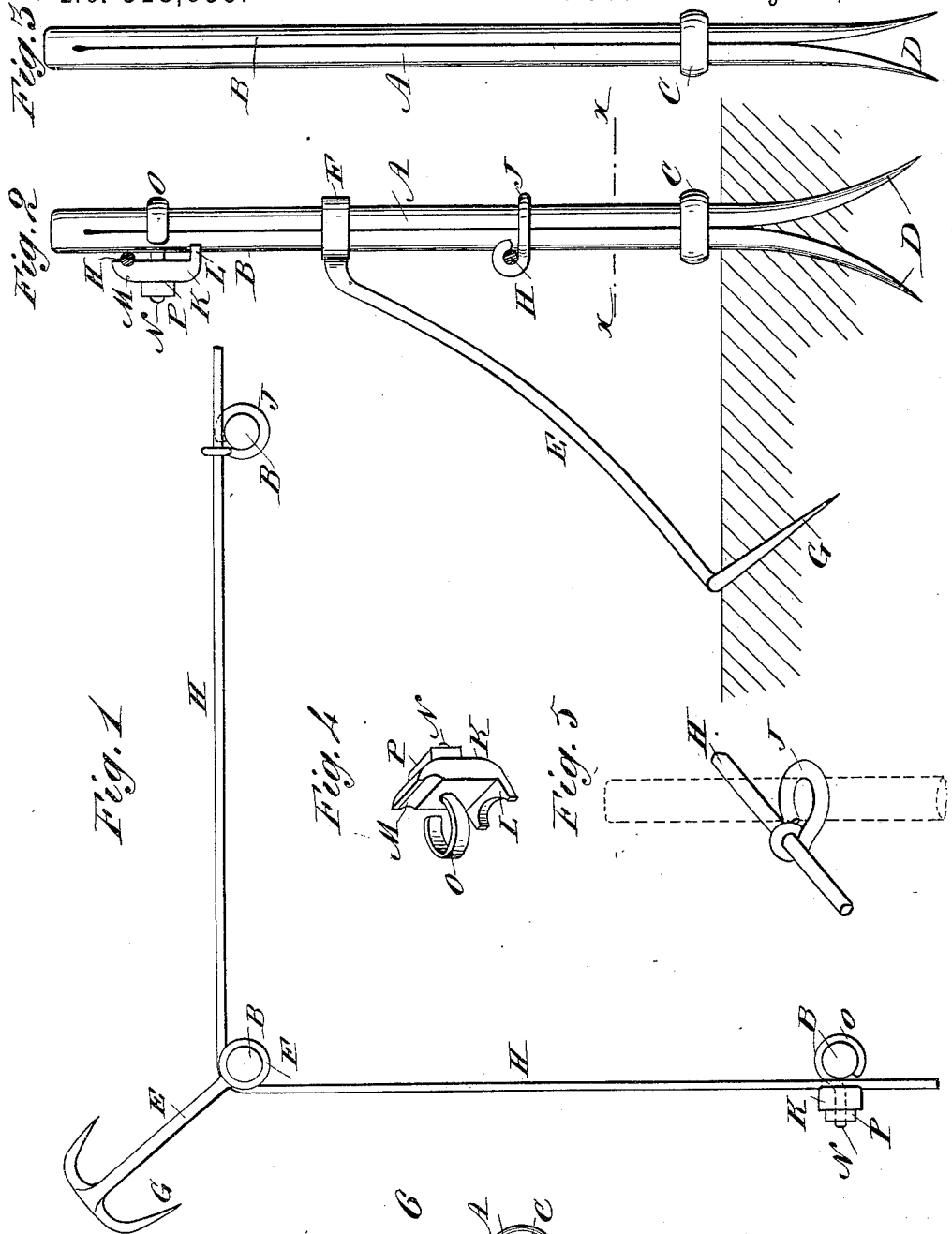

WILLIAM H. M. REESE, OF CALLIOPE, IOWA.

WIRE-FASTENING DEVICE FOR METAL FENCE-POSTS.

SPECIFICATION forming part of Letters Patent No. 318,655, dated May 26, 1885.

Application filed December 31, 1884. (Model.)

*To all whom it may concern:*

Be it known that I, WILLIAM H. M. REESE, of Calliope, in the county of Sioux and State of Iowa, have invented a new and Improved Wire-Fastening Device for Metal Fence-Posts, of which the following is a full, clear, and exact description.

The invention consists of the combination of parts and their construction, substantially as hereinafter fully set forth, and pointed out in the claim.

Reference is to be had to the accompanying drawings, forming a part of this specification, in which similar letters of reference indicate corresponding parts in all the figures.

Figure 1 is a plan view of part of a fence constructed with my improved post. Fig. 2 is a side view of the post driven into the ground. Fig. 3 is a side view of the same before being driven into the ground. Fig. 4 is a perspective view of the wire-holding clamp. Fig. 5 is a perspective view of a wire-holding loop. Fig. 6 is a sectional plan view of the post on the line *x x*, Fig. 2.

A half-round, round, flat or square metal bar, A, or a bar having any other rectangular or like cross-section, has its ends tapered and pointed and is bent or doubled over at the middle to form a post, B, and the two parts are held together near the lower end by a strong collar, C, to prevent them from separating. The post is driven into the ground, whereby the pointed ends or prongs D are spread, as shown in Fig. 2, and thus hold the post securely, the collar C resting on the ground. The corner post of a fence is braced by a brace, E, having a collar, F, at its upper end, through which the post is passed, and at its lower end provided with an angularly-bent fork, G, which is driven into the ground.

The fence-wires H are held on the post by a wire loop, J, passed around the wire and around the post, or they are held by a clamp-plate, K, having its lower end provided with a forked projection, L, fitting on the post and its other end with a transverse groove, M, for receiving the wire.

The shank N of a hook-bolt, O, is passed through the clamp-plate K, and a nut, P, is screwed on the said shank. The hook O is passed around the post, the fence-wire H is inserted in the groove M, and the plate K is clamped against the wire H and the post by drawing the nut up tightly.

I am aware of the existence of a fence-post having a contrivance to secure or connect the wire thereto, consisting of a shackle with each of its two arms bearing against the post and connected to the latter by a ring-bolt, the wire simply passing through said shackle and not clamped to the post by the shackle, as by my fence-post contrivance or clamp.

Having thus fully described my invention, I claim as new and desire to secure by Letters Patent—

The combination, with a post, of the clamp-plate K, having a groove, M, at or near one end and a forked projection, L, at the other end, the hook-bolt N, and the nut P, substantially as herein shown and described.

WILLIAM H. M. REESE.

Witnesses:
SELAH VAN SICKLE,
ISAAC N. DECK.